(12) United States Patent
Guo et al.

(10) Patent No.: US 7,471,858 B2
(45) Date of Patent: Dec. 30, 2008

(54) CONFIGURABLE DISPERSION COMPENSATION TRIMMER

(75) Inventors: Bo Guo, Centereach, NY (US); Marvin R. Young, Richardson, TX (US); Michael H. Eiselt, Middletown, NJ (US)

(73) Assignee: Pivotal Decisions LLC, Las Vegas, NV (US)

( * ) Notice: Subject to any disclaimer, the term of this patent is extended or adjusted under 35 U.S.C. 154(b) by 0 days.

(21) Appl. No.: 11/515,480

(22) Filed: Aug. 31, 2006

(65) Prior Publication Data

US 2007/0003188 A1    Jan. 4, 2007

Related U.S. Application Data

(62) Division of application No. 10/454,812, filed on Jun. 3, 2003.

(60) Provisional application No. 60/385,948, filed on Jun. 4, 2002.

(51) Int. Cl.
    *G02B 6/26* (2006.01)
(52) U.S. Cl. .......................... 385/16; 385/27
(58) Field of Classification Search ............. 385/15–25, 385/27, 134, 147
    See application file for complete search history.

(56) References Cited

U.S. PATENT DOCUMENTS

| | | | |
|---|---|---|---|
| 4,229,831 A | 10/1980 | Lacher | 455/619 |
| 4,535,459 A | 8/1985 | Hogge, Jr. | 375/80 |
| 4,636,859 A | 1/1987 | Vernhet et al. | 358/147 |
| 4,710,022 A | 12/1987 | Soeda et al. | 356/73.1 |
| 5,224,183 A | 6/1993 | Dugan | 385/24 |
| 5,225,922 A | 7/1993 | Chraplyvy et al. | 359/124 |
| 5,267,071 A | 11/1993 | Little et al. | 398/162 |
| 5,299,048 A | 3/1994 | Suyama | 359/179 |
| 5,321,541 A | 6/1994 | Cohen | 359/127 |
| 5,455,703 A | 10/1995 | Duncan et al. | 359/152 |
| 5,559,625 A | 9/1996 | Smith et al. | 359/125 |
| 5,608,562 A | 3/1997 | Delavaux et al. | 398/148 |
| 5,613,210 A | 3/1997 | Van Driel et al. | 455/45 |
| 5,726,784 A | 3/1998 | Alexander et al. | 359/125 |
| 5,778,116 A | 7/1998 | Tomich | 385/16 |
| 5,790,285 A | 8/1998 | Mock | 359/110 |
| 5,812,290 A | 9/1998 | Maeno et al. | 359/117 |
| 5,877,881 A | 3/1999 | Miyauchi et al. | 398/193 |

(Continued)

FOREIGN PATENT DOCUMENTS

JP    01115230    5/1989

(Continued)

OTHER PUBLICATIONS

United States Patent and Trademark Office: Non-Final Office Action dated Jun. 14, 2007, U.S. Appl. No. 11/515,331, 17 pages.

(Continued)

*Primary Examiner*—Kevin S Wood
(74) *Attorney, Agent, or Firm*—Woodcock Washburn LLP (57) ABSTRACT

The invention pertains to optical fiber transmission systems, and is particularly relevant to transmission of large volumes of data over long distances at high rates. An improved apparatus achieving precise dispersion compensation in a fiber span is disclosed. In particular, the invention teaches a configurable dispersion compensation trimmer with automatic detection of configuration.

20 Claims, 6 Drawing Sheets

U.S. PATENT DOCUMENTS

| | | | | |
|---|---|---|---|---|
| 5,903,613 | A | 5/1999 | Ishida | 375/340 |
| 5,914,794 | A | 6/1999 | Fee et al. | 359/110 |
| 5,914,799 | A | 6/1999 | Tan | 359/167 |
| 5,936,753 | A | 8/1999 | Ishikawa | 359/125 |
| 5,963,350 | A | 10/1999 | Hill | 359/123 |
| 5,995,694 | A | 11/1999 | Akasaka et al. | 385/123 |
| 6,005,702 | A | 12/1999 | Suzuki et al. | 398/185 |
| 6,005,997 | A | 12/1999 | Robinson et al. | 385/24 |
| 6,021,245 | A | 2/2000 | Berger et al. | 385/123 |
| 6,043,914 | A | 3/2000 | Cook et al. | 398/1 |
| 6,075,634 | A | 6/2000 | Casper et al. | 359/152 |
| 6,078,414 | A | 6/2000 | Iwano | 359/124 |
| 6,081,360 | A | 6/2000 | Ishikawa et al. | 398/147 |
| 6,084,694 | A | 7/2000 | Milton et al. | 359/124 |
| 6,088,152 | A | 7/2000 | Berger et al. | 359/334 |
| 6,108,074 | A | 8/2000 | Bloom | 356/73.1 |
| 6,122,095 | A | 9/2000 | Fatehi | 359/337 |
| 6,151,334 | A | 11/2000 | Kim et al. | 370/468 |
| 6,157,477 | A | 12/2000 | Robinson | 398/147 |
| 6,160,614 | A | 12/2000 | Unno | 356/73.1 |
| 6,163,392 | A | 12/2000 | Condict et al. | 359/124 |
| 6,163,636 | A | 12/2000 | Stentz et al. | 385/24 |
| 6,173,094 | B1 | 1/2001 | Bowerman et al. | 385/24 |
| 6,177,985 | B1 | 1/2001 | Bloom | 356/73.1 |
| 6,198,559 | B1 | 3/2001 | Gehlot | 398/161 |
| 6,229,599 | B1 | 5/2001 | Galtarossa | 356/73.1 |
| 6,236,499 | B1 | 5/2001 | Berg et al. | 359/341 |
| 6,246,510 | B1 | 6/2001 | BuAbbud et al. | 359/337 |
| 6,259,553 | B1 | 7/2001 | Kinoshita | 358/1.15 |
| 6,259,554 | B1 | 7/2001 | Shigematsu et al. | 359/337 |
| 6,259,693 | B1 | 7/2001 | Ganmukhi et al. | 370/366 |
| 6,259,845 | B1 | 7/2001 | Sardesai | 385/123 |
| 6,272,185 | B1 | 8/2001 | Brown | 375/340 |
| 6,275,315 | B1 | 8/2001 | Park et al. | 398/148 |
| 6,288,811 | B1 | 9/2001 | Jiang et al. | 359/127 |
| 6,288,813 | B1 | 9/2001 | Kirkpatrick et al. | 359/152 |
| 6,307,656 | B2 | 10/2001 | Terahara | 359/124 |
| 6,317,231 | B1 | 11/2001 | Al-Salameh et al. | 359/110 |
| 6,317,255 | B1 | 11/2001 | Fatehi et al. | 359/110 |
| 6,320,687 | B1 | 11/2001 | Ishikawa | 398/147 |
| 6,323,950 | B1 | 11/2001 | Kim et al. | 356/477 |
| 6,327,060 | B1 | 12/2001 | Otani et al. | 359/110 |
| 6,356,384 | B1 | 3/2002 | Islam | 359/334 |
| 6,359,729 | B1 | 3/2002 | Amoruso | 359/341 |
| 6,370,300 | B1 | 4/2002 | Eggleton et al. | 385/37 |
| 6,388,801 | B1 | 5/2002 | Sugaya et al. | 359/334 |
| 6,393,188 | B1 | 5/2002 | Jeong et al. | 385/123 |
| 6,396,853 | B1 | 5/2002 | Humphrey et al. | 370/535 |
| 6,417,961 | B1 | 7/2002 | Sun et al. | 359/337.5 |
| 6,501,892 | B1 | 12/2002 | Okuno et al. | 385/127 |
| 6,501,982 | B1 | 12/2002 | Ruchti et al. | 600/473 |
| 6,504,973 | B1 | 1/2003 | DiGiovanni et al. | 385/27 |
| 6,519,082 | B2 | 2/2003 | Ghera et al. | 359/341.4 |
| 6,757,468 | B2 | 6/2004 | Bickham et al. | 385/127 |
| 6,865,311 | B2 * | 3/2005 | Li et al. | 385/17 |
| 6,943,935 | B2 | 9/2005 | Bickham et al. | 359/334 |
| 6,965,738 | B2 | 11/2005 | Eiselt et al. | 398/127 |
| 2001/0005271 | A1 | 6/2001 | Leclerc et al. | 398/102 |
| 2001/0007605 | A1 | 7/2001 | Inagaki et al. | 385/123 |
| 2001/0009468 | A1 | 7/2001 | Fee | 398/147 |
| 2001/0014104 | A1 | 8/2001 | Bottorff et al. | 370/395.5 |
| 2002/0012152 | A1 | 1/2002 | Agazzi et al. | 359/189 |
| 2002/0015220 | A1 | 2/2002 | Papernly et al. | 359/334 |
| 2002/0034197 | A1 | 3/2002 | Tornetta et al. | 370/537 |
| 2002/0044317 | A1 | 4/2002 | Gentner et al. | 398/160 |
| 2002/0044324 | A1 | 4/2002 | Hoshida et al. | 398/178 |
| 2002/0048287 | A1 | 4/2002 | Silvers | 370/493 |
| 2002/0051468 | A1 | 5/2002 | Ofek et al. | 370/498 |
| 2002/0063948 | A1 | 5/2002 | Islam et al. | 359/334 |
| 2002/0064181 | A1 | 5/2002 | Ofek et al. | 370/401 |
| 2002/0075903 | A1 | 6/2002 | Hind | 370/535 |
| 2002/0080809 | A1 | 6/2002 | Nicholson et al. | 375/240.26 |
| 2003/0026533 | A1 | 2/2003 | Danziger et al. | 385/27 |
| 2003/0047524 | A1 | 3/2003 | Sato et al. | 211/1 |
| 2004/0042067 | A1 | 3/2004 | Eiselt | 359/344 |
| 2004/0208607 | A1 | 10/2004 | Eiselt et al. | 398/147 |

FOREIGN PATENT DOCUMENTS

| | | |
|---|---|---|
| JP | 02238736 | 9/1990 |

OTHER PUBLICATIONS

United States Patent and Trademark Office: Non-Final Office Action dated Mar. 24, 2006, U.S. Appl. No. 11/179,134, 14 pages.
United States Patent and Trademark Office: Final Office Action dated Sep. 21, 2006, U.S. Appl. No. 11/179,134, 14 pages.
United States Patent and Trademark Office: Non-Final Office Action dated Jun. 14, 2007, U.S. Appl. No. 11/179,134, 15 pages.
United States Patent and Trademark Office: Final Office Action dated Nov. 27, 2007, U.S. Appl. No. 11/179,134, 14 pages.
United States Patent and Trademark Office: Non-Final Office Action dated May 29, 2008, U.S. Appl. No. 11/179,134, 13 pages.

* cited by examiner

| Connections | Dispersion Trimmer Value |
|---|---|
| 205 to 207 | 0 |
| 205 to 221, 223 to 207 | $\delta$ |
| 205 to 225, 227 to 207 | $2\delta$ |
| 205 to 221, 223 to 225, 227 to 207 | $3\delta$ |
| 205 to 229, 231 to 207 | $4\delta$ |
| 205 to 221, 223 to 229, 231 to 207 | $5\delta$ |
| 205 to 225, 227 to 229, 231 to 207 | $6\delta$ |
| 205 to 221, 223 to 225, 227 to 229, 231 to 207 | $7\delta$ |

CONFIGURABLE DISPERSION COMPENSATION TRIMMER

CROSS REFERENCE TO RELATED APPLICATIONS

This application is a continuation of U.S. patent application Ser. No. 10/454,812 filed Jun. 3, 2003, which claims benefit to Provisional Application Ser. No. 60/385,948, filed Jun. 4, 2002, the contents of which are incorporated by reference herein in their entireties. This application is related by subject matter to U.S. Pat. No. 6,965,738, issued Nov. 15, 2005; U.S. patent application Ser. No. 11/179,143, filed Jul. 11, 2005; and U.S. patent application Ser. No. 11/515,331, filed Aug. 31, 2006.

FIELD OF THE INVENTION

The invention pertains to optical fiber transmission systems, and is particularly relevant to transmission of large volumes of data over long distances at high rates. An improved apparatus achieving precise dispersion compensation in a fiber span is disclosed. In particular, the invention teaches a configurable dispersion compensation trimmer with automatic detection of configuration.

BACKGROUND OF THE INVENTION

A goal of many modern long haul optical transport systems is to provide for the efficient transmission of large volumes of voice traffic and data traffic over trans-continental distances at low costs. Various methods of achieving these goals include time division multiplexing (TDM) and wavelength division multiplexing (WDM). In time division multiplexed systems, data streams comprised of short pulses of light are interleaved in the time domain to achieve high spectral efficiency, high data rate transport. In wavelength division multiplexed systems, data streams comprised of short pulses of light of different carrier frequencies, or equivalently wavelength, are co-propagate in the same fiber to achieve high spectral efficiency, high data rate transport.

The transmission medium of these systems is typically optical fiber. In addition there is a transmitter and a receiver. The transmitter typically includes a semiconductor diode laser, and supporting electronics. The laser may be directly modulated with a data train with an advantage of low cost, and a disadvantage of low reach and capacity performance. After binary modulation, a high bit may be transmitted as an optical signal level with more power than the optical signal level in a low bit. Often, the optical signal level in a low bit is engineered to be equal to, or approximately equal to zero. In addition to binary modulation, the data can be transmitted with multiple levels, although in current optical transport systems, a two level binary modulation scheme is predominantly employed.

Consequently the data propagates through the optical fiber as a short pulse. One of the impairments that this pulse can suffer is its spreading, or dispersion, in time. Excessive pulse spreading resulting from dispersion will cause interference between adjacent bits at the receiver. Dispersion can occur for a variety of reasons both linear and nonlinear, in multimode fiber, different transverse modes propagate different effective distances, to cause modal dispersion. Consequently optical transport over any appreciable distance is accomplished using single mode fiber. Chromatic dispersion of the pulse occurs because the index of refraction of the glass fiber varies with frequency. Since a short data pulse is comprised of a band of frequencies, chromatic dispersion causes pulse shape distortion and spreading as the different spectral components of the data pulse propagate at different velocities in the fiber. In modern optical transport systems this dispersion, or pulse spreading must be periodically corrected, while comprehending the effect of pulsewidth on the nonlinear impairments in the fiber.

Correcting for chromatic dispersion is therefore an important engineering challenge in optical transport systems. As the reach or capacity of a long haul optical transport system increases, so do the requirements on dispersion compensation. Dispersion compensation is accomplished by adding lengths of fiber to positively or negatively correct for dispersion. For ultra long haul optical transport systems, dispersion compensation must be done quite often, and must be done with great precision. This precision creates a logistical challenge to ensure the correct dispersion compensation is available at time of installation. Currently dispersion compensators are highly customized, and are not designed to alleviate this logistical challenge. There is a need for flexible dispersion compensators that are settable to a precise dispersion compensation value upon installation.

A second challenge that arises with ultra long haul transport systems is that there physical plant extends over thousands of kilometers. In current optical transport systems inventory and configuration data is recorded manually. There is a need for the automated recording of dispersion configuration data in particular in optical transport systems.

It is an object of this invention to teach an improved method and apparatus for measuring dispersion that does not suffer from these limitations in accuracy and precision. It is a further object of this invention to provide a compact apparatus that makes a chromatic dispersion measurement in only a few seconds.

SUMMARY OF THE INVENTION

In the present invention, an improved apparatus achieving precise dispersion compensation in a fiber span is taught as required by ultra long haul optical transport systems capable of transcontinental reach.

In one embodiment of the invention, a flexible dispersion compensator that is settable to a precise dispersion compensation value is disclosed.

In another embodiment of the invention a configurable dispersion compensation trimmer is disclosed In another embodiment of the invention, a configurable dispersion compensation trimmer with automatic detection of configuration is disclosed.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF ILLUSTRATIVE EMBODIMENTS

While the making and using of various embodiments of the present invention are discussed in detail below, it should be appreciated that the present invention provides many applicable inventive concepts which can be embodied in a wide variety of specific contexts. The specific embodiments described herein are merely illustrative of specific ways to make and use the invention and do not delimit the scope of the invention.

Figure 1:
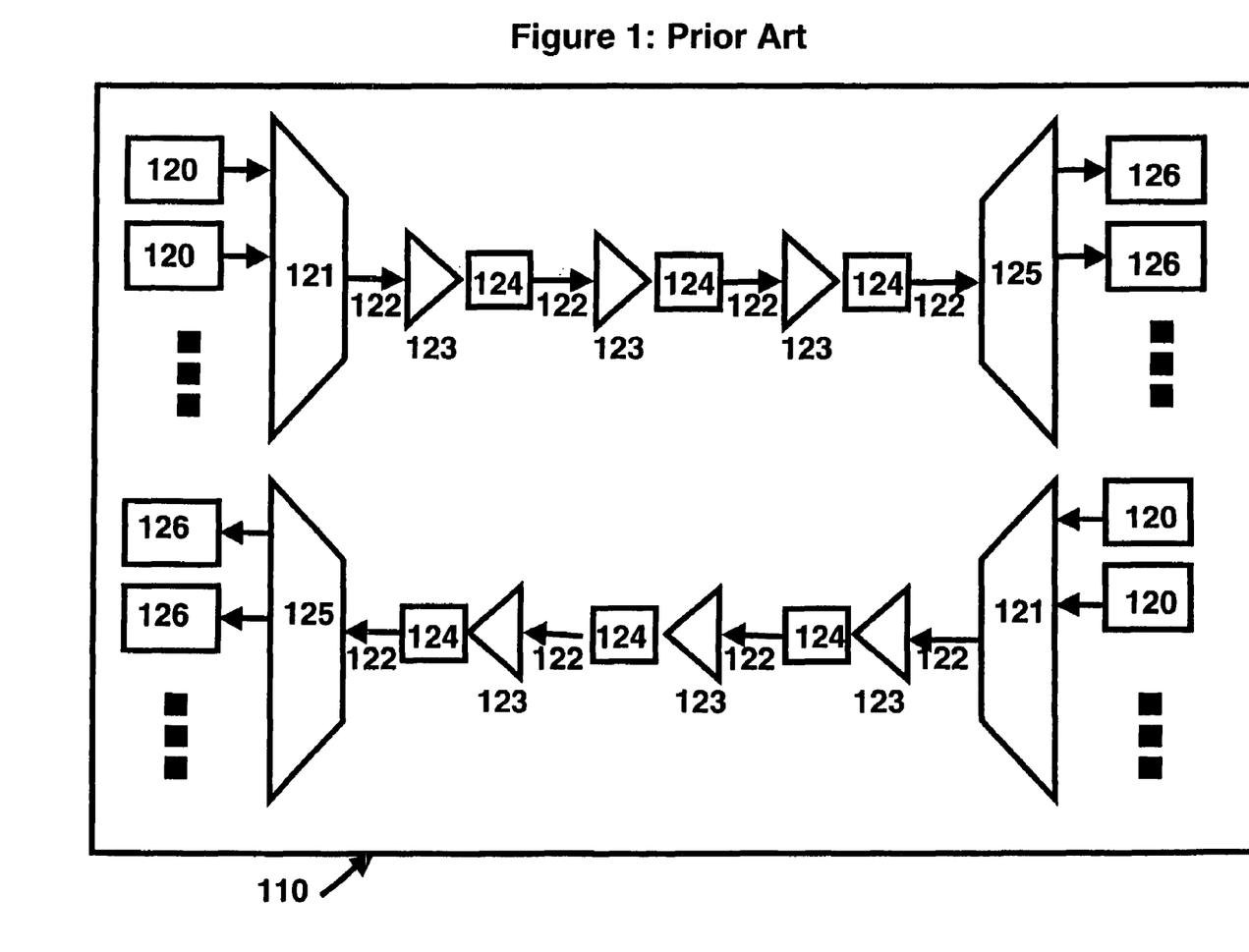
FIG. 1 is a schematic illustration of a prior art multiplexed optical transport system.

FIG. 1 is an illustrative block diagram of an optical transport system 110 for data and/or voice transmission used to support the present invention. Typical long haul optical transport dense wavelength division multiplexed (DWDM) systems transmit 40 to 80 10 Gbps (gigabit per second) channels across distances of 1500 to 6000 km in a single 30 nm spectral band. Shown in the figure is a duplex system in which traffic is both transmitted and received between parties at opposite end of the link. The optical carrier is generated using transmitters 120. In current DWDM long haul transport systems transmitters 120 are DFB lasers stabilized to specified frequencies on the ITU frequency grid and externally modulated.

In a DWDM system, different channels operating at distinct carrier frequencies are multiplexed using a multiplexer 121. Such multiplexers may be implemented using array waveguide (AWG) technology or thin film technology, or a variety of other technologies. After multiplexing, the optical signals are coupled into the transport fiber for transmission to the receiving end of the link. The total link distance may in today's optical transport systems be two different cities separated by continental distances, from 1000 km to 6000 km, for example. To successfully bridge these distances with sufficient optical signal power relative to noise, the total fiber distance is separated into fiber spans 122, and the optical signal is periodically amplified using an in line optical amplifier 123 after each fiber span 122. Typical fiber span distances between optical amplifiers 123 is 50-100 km. Thus, for example, 30 100 km spans would be used to transmit optical signals between points 3000 km apart. Examples of inline optical amplifiers 123 include erbium doped fiber amplifiers (EDFAs) and semiconductor optical amplifiers (SOAs).

Often, there is also included dispersion compensation modules 124 with the in line amplifiers 123. These dispersion compensator modules 124 adjust the phase information of the optical pulses in order to compensate for the chromatic dispersion in the optical fiber while counteracting the role of optical nonlinearities in the optical fiber.

At the receiving end of the link, the optical channels are de-multiplexed using a de-multiplexer 125. Such de-multiplexers may be implemented using array waveguide (AWG) technology or thin film technology, or a variety of other technologies. Each channel is then optically coupled to separate optical receivers 126. The optical receiver 126 is typically comprised of a semiconductor photodetector and accompanying electronics.

It is a purpose of this invention to teach improved dispersion compensators. An improved apparatus achieving precise dispersion compensation in a fiber span is disclosed. In particular, the invention teaches a configurable dispersion compensation trimmer with automatic detection of configuration.

It should be noted that FIG. 1 depicts an optical transport system 110 supporting duplex operation wherein each endpoint can both send and receive voice and data traffic. This is important to achieve a typical conversation or data transaction. In FIG. 1, duplex operation is shown to use two distinct fibers, the both together often referred to as a fiber pair. For example, optical transport systems are sometimes deployed with bidirectional traffic providing duplex service on a single fiber.

Other common variations include the presence of post-amplifiers and pre-amplifers just before and after the multiplexer 121 and de-multiplexer 125. Another variation that may be employed is the optical dropping and adding of channels at cities located in between the two end cities. The invention disclosed herein, would find application in any of these variations, as well as others. For example, the improved dispersion compensator module taught herein would benefit short reach, or metro applications which may not include an inline optical amplifier 123.

Figure 2:
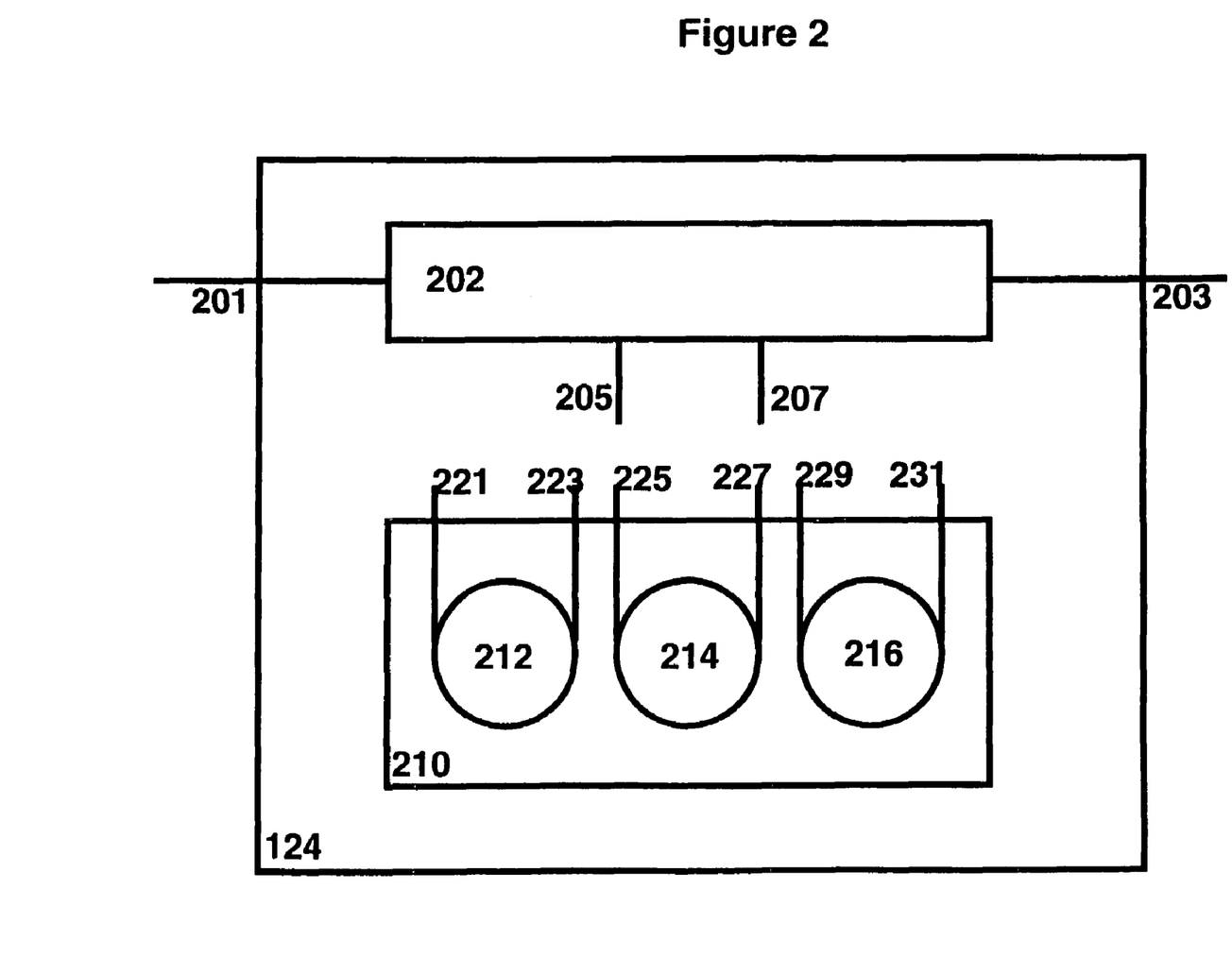
FIG. 2 is a schematic illustration of a dispersion compensator including a configurable dispersion compensation trimmer in accordance with the invention.

In FIG. 2 is shown elements of the invention in relation to dispersion compensator 124. In accordance with the invention, dispersion compensator 124 comprises a standard dispersion compensator module 202 and dispersion compensator trimmer 210. Dispersion compensator trimmer 210 comprises short dispersion trim section 212, intermediate dispersion trim section 214 and long dispersion trim section 216. In the preferred embodiment each of the trim sections is a length of fiber capable of compensating for a certain amount of dispersion. Dispersion compensator 124 further comprises main input 201 and main output 203. Standard dispersion compensator module 202 further comprises internal output 205 and internal input 207. In a preferred embodiment internal output 205 is comprised of a short length of connectorized fiber. In a preferred embodiment internal input 207 is comprised of a short length of connectorized fiber. Dispersion compensator trimmer 210 further comprises short dispersion trim section input 221, short dispersion trim section output 223, intermediate dispersion trim section input 225, intermediate dispersion trim section output 227, long dispersion trim section input 229 and long dispersion trim section output 231. In a preferred embodiment short dispersion trim section input 221 is comprised of a length of connectorized fiber. In a preferred embodiment short dispersion trim section output 223 is comprised of a length of connectorized fiber. In a preferred embodiment intermediate dispersion trim section input 225 is comprised of a length of connectorized fiber. In a preferred embodiment intermediate dispersion trim section output 227 is comprised of a length of connectorized fiber. In a preferred embodiment long dispersion trim section input 229 is comprised of a length of connectorized fiber. In a preferred embodiment long dispersion trim section output 231 is comprised of a short length of connectorized fiber.

The connectors on the connectorized inputs and outputs may further be specified to enable a large degree of interconnectivity as will be taught below, in reference to FIG. 3. Therefore, in a preferred embodiment internal output 205 is comprised of a short length of connectorized fiber. Internal input 207 is comprised of a short length of connectorized fiber. Short dispersion trim section input 221 is comprised of a length of connectorized fiber and short dispersion trim section output 223 is comprised of a length of connectorized fiber. Intermediate dispersion trim section input 225 is comprised of a length of connectorized fiber and intermediate dispersion trim section output 227 is comprised of a length of connectorized fiber. Long dispersion trim section input 229 is comprised of a length of connectorized fiber and long dispersion trim section output 231 is comprised of a short length of connectorized fiber. Output 205 and inputs 223, 227 and 231 are coupled to female connectors. Inputs 207 output 223, 227 and 231 are coupled to male connectors. In this embodiment it will be understood that any of the male connectors may be coupled with any of the female connectors. It should be understood that the orientation of the connectors is not critical and may be reversed, so long as a secure connection between the lengths of fiber are achieved.

In a preferred embodiment standard dispersion compensator 202 is comprised of a dispersion element that will correct for approximately 70-100% of the required dispersion in an average fiber span 122. In a preferred embodiment this dispersion element comprises a length of dispersion compensating fiber. This dispersion element is positioned between main input 201 and internal output 205, or this dispersion element is positioned between internal input 207 and main output 203. In this embodiment short dispersion trim section 212, intermediate dispersion trim section 214 and long dispersion trim section 216 are comprised of additional lengths of dispersion compensating fiber.

In an alternate embodiment standard dispersion compensator 202 is comprised of a dispersion element that will correct for approximately 100-130% of the required dispersion in an average fiber span 122. In a preferred embodiment this dispersion element comprises a length of dispersion compensating fiber. This dispersion element is positioned between main input 201 and internal output 205, or this dispersion element is positioned between internal input 207 and main output 203. In this alternate embodiment short dispersion trim section 212, intermediate dispersion trim section 214 and long dispersion trim section 216 are comprised of lengths of SMF-28 fiber.

In a preferred embodiment, the length of fiber in short dispersion trim section 212 provides amount of dispersion equal to δ, intermediate dispersion trim section 214 provides amount of dispersion equal to 2δ, and long dispersion trim section 216 provides amount of dispersion equal to 4δ. It should be noted that more than three trim sections can be included in the dispersion compensation trimmer. If so, the lengths of fiber in the trimmers can be dictated by the series:

$$2^0\delta, 2^1\delta, 2^2\delta \ldots 2^{n-1}\delta$$

where "n" is the number of trimmers. The result is that through correct permutation an offset dispersion of δ, 2 δ, 3 δ ... $2^n$ δ can be achieved in general. Of course, no dispersion trimming is achieved when the trimmers are bypassed.

Figure 6:
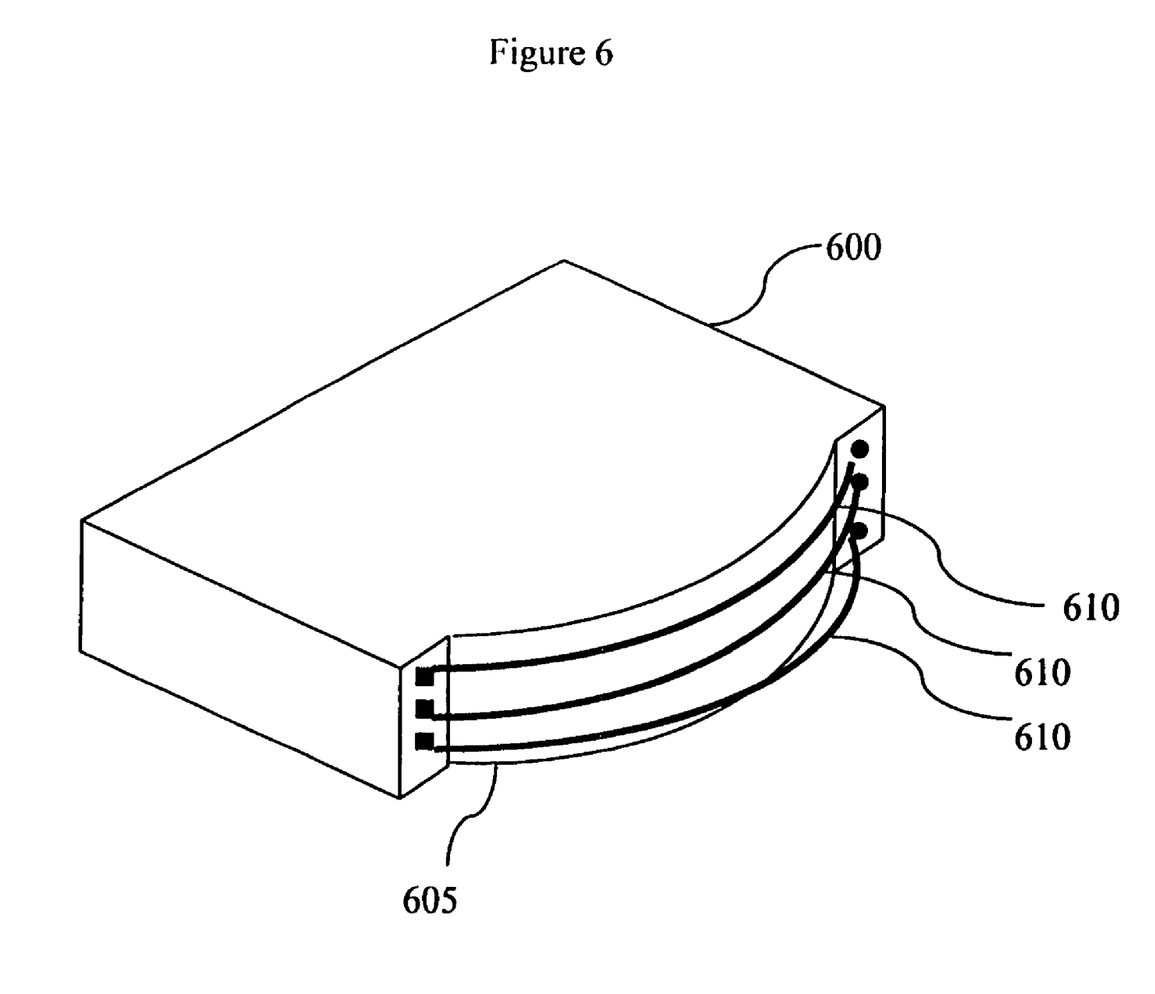
FIG. 6 is a drawing of the physical implementation of the multi-layer and fiber routing guide of a preferred embodiment of the dispersion compensation trimmer.

In an alternate preferred embodiment, short dispersion trim section 212, intermediate dispersion trim section 214 and long dispersion trim section 216 are disposed vertically on top of each other in order to conserve space. As shown in FIG. 6, in an additional improvement, the front surface 605 of the case 600 of the dispersion compensation trimmer 210 is curved to guide the routing of pigtails 610 and relieve stress on the fiber.

The use of the standard dispersion compensator module 202 and dispersion compensator trimmer 210 may now be understood in reference to FIG. 2. To achieve a dispersion compensator 124 with only the amount of dispersion afforded by standard dispersion compensator module 202, internal output 205 is connected to internal input 207. In this configuration, an optical signal flows into main input 201, through the dispersion element in standard dispersion compensator module 202, and out main output 203. To achieve a dispersion compensator 124 with the amount of dispersion afforded by standard dispersion compensator module 202 plus the amount of dispersion in dispersion compensator trimmer 210, internal output 205 is connected to one of short dispersion trim section input 221, intermediate dispersion section input 225 or long dispersion trim section input 229, while internal input 207 is connected to one of short dispersion trim section output 221, intermediate dispersion section output 225 or long dispersion trim section output 229. In this configuration, an optical signal flows into main input 201, through the dispersion element in standard dispersion compensator module 202, through dispersion compensator trimmer 210 and out main output 203.

Figure 3:
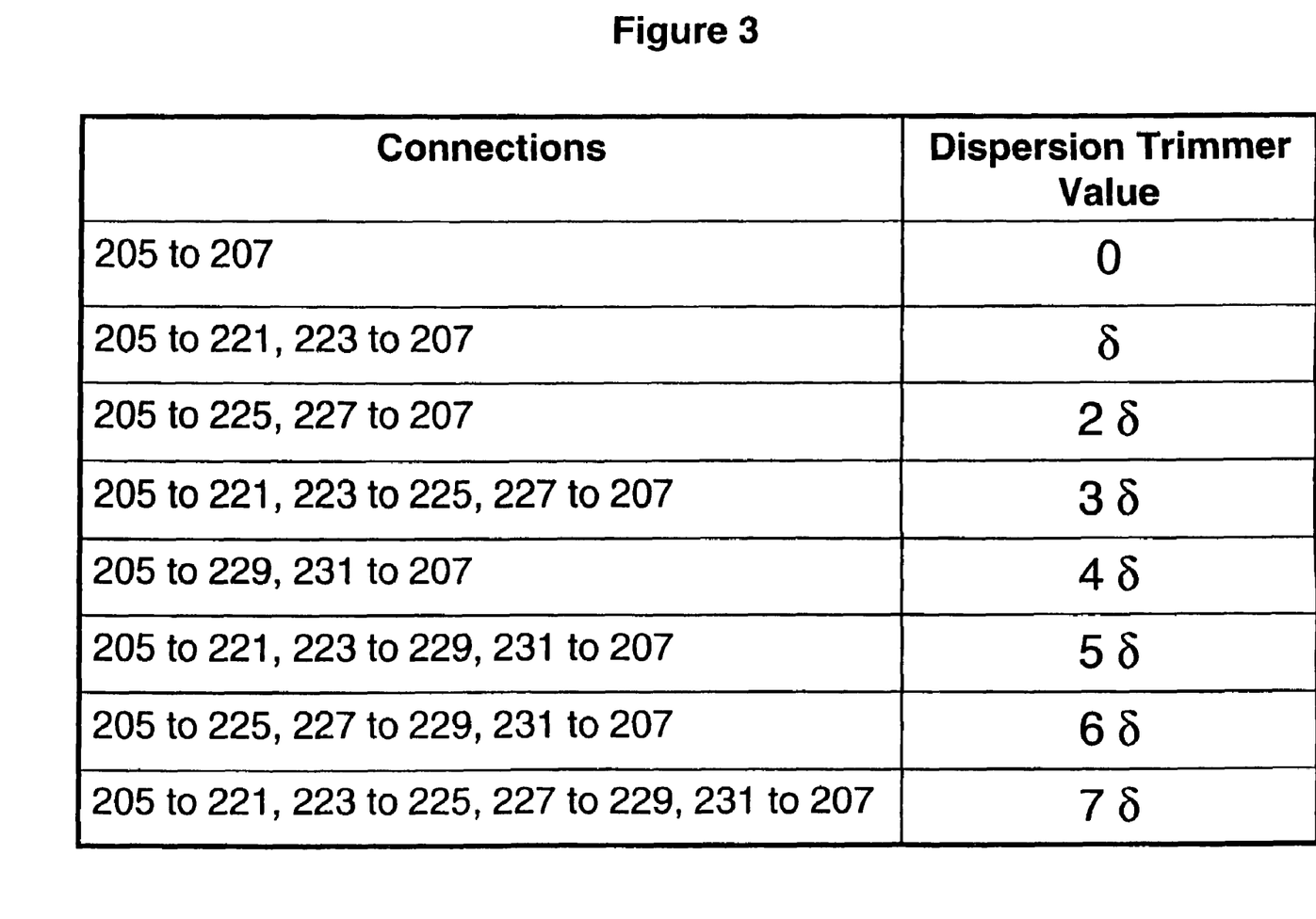
FIG. 3 is a connection table that illustrating the connections of the configurable dispersion compensation trimmer to achieve different dispersion compensation trims, in accordance with a preferred embodiment of the invention.

In FIG. 3 is a table showing the connections for achieving eight different levels of dispersion using dispersion compensator trimmer 210 shown in FIG. 2. For example, to achieve a trim value of 5δ internal output 205 is connected to short dispersion trim section input 221, short dispersion trim section output 223 is connected to long dispersion trim section input 229, and long dispersion trim section output 331 is connected to internal input 207. In this manner, the 1δ of dispersion trim in short dispersion trim section 212 is added to the 4δ of dispersion trim in long dispersion trim section 216 to achieve an additive total dispersion trim of 5δ. Total dispersion trim values ranging incrementally from 0δ to 7δ are obtained by following the connections laid forth in FIG. 3.

Figure 4:
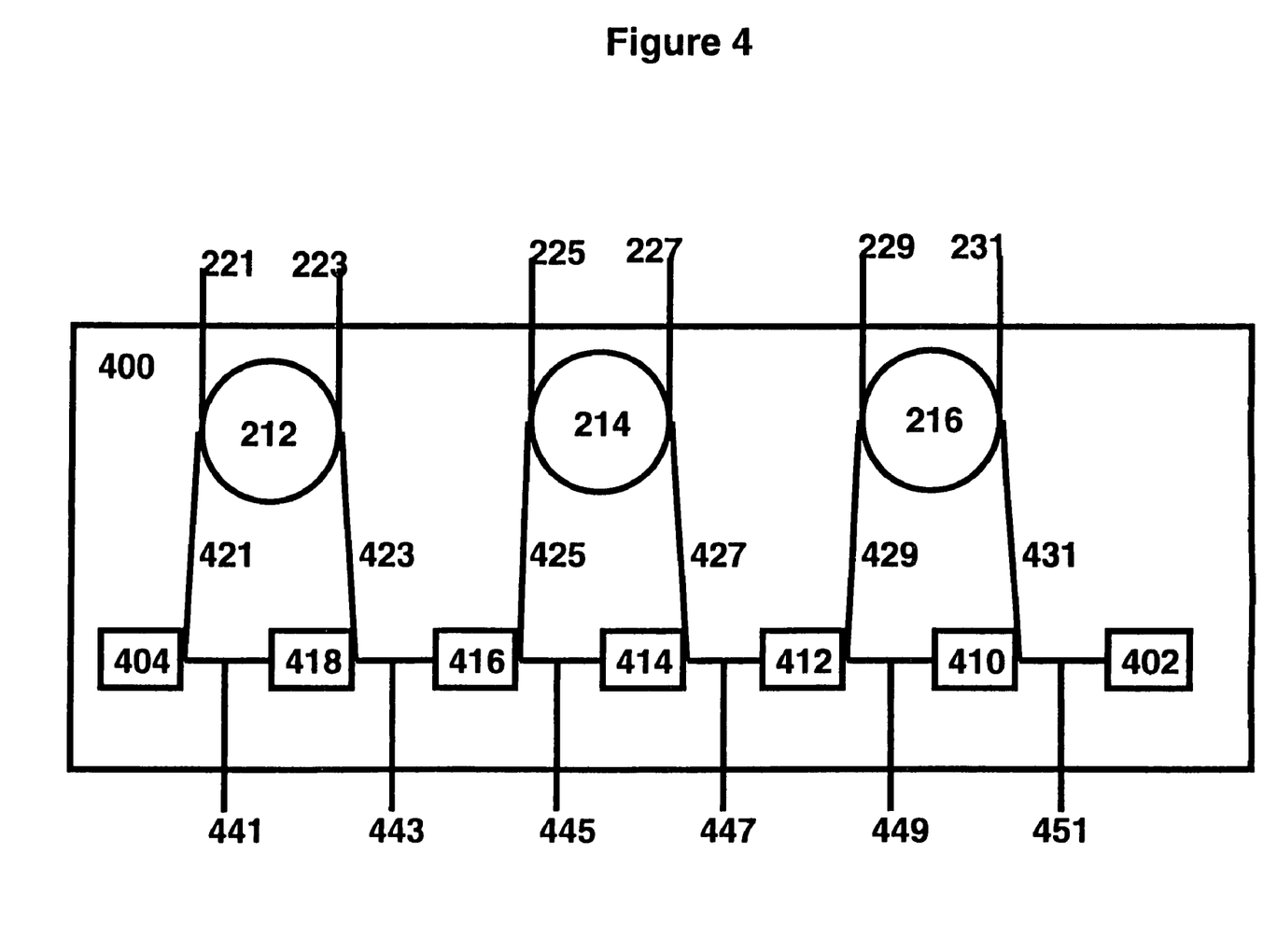
FIG. 4 is a schematic illustration of a dispersion compensation trimmer section with automatic detection in accordance with one aspect of the invention.

In FIG. 4 is shown in schematic illustration a dispersion compensation trimmer section with automatic detection 400 in accordance with one aspect of the invention. The dispersion compensation trimmer section with automatic detection 400 comprises a DC power supply 402 and a ground reference 404. The dispersion compensation trimmer section with automatic detection 400 further comprises resistor 410, resistor 412, resistor 414, resistor 416, and resistor 418. As shown in FIG. 4, DC power supply 402 is electrically connected to one lead of resistor 410, the other lead of resistor 410 is connected to one lead of resistor 412, the other lead of resistor 412 is connected to one lead of resistor 414, the other lead of resistor 414 is connected to one lead of resistor 416, the other lead of resistor 416 is connected to resistor 418, the other lead of resistor 418 is connected to ground reference 404. In this manner, DC power supply 402 ground reference 404, resistor 410, resistor 412, resistor 414, resistor 416, and resistor 418 comprise a voltage dividing resistor ladder as is well known in the art.

As shown in FIG. 4, the dispersion compensation trimmer section with automatic detection 400 further comprises long dispersion trim section electronic output connection 431, long dispersion trim section electronic input connection 429, intermediate dispersion trim section electronic output connection 427, intermediate dispersion trim section electronic input connection 425, short dispersion trim section electronic output connection 423 and short dispersion trim section electronic input connection 421. In a preferred embodiment, long dispersion trim section electronic output connection 431, long dispersion trim section electronic input connection 429, intermediate dispersion trim section electronic output connection 427, intermediate dispersion trim section electronic input connection 425, short dispersion trim section electronic output connection 423 and short dispersion trim section electronic input connection 421 are realized by electrical wiring with connectors that are embedded in the optical connectors in such a manner as to electrically connect when an optical connection is made. As shown in FIG. 4, the other end of the electrical wiring is connected to the resistors in the voltage dividing resistor ladder.

For example, one end of long dispersion trim section electronic output connection 431 is mechanically attached to long dispersion trim sction output 231 and the other end of long dispersion trim section electronic output connection 431 is electrically connected to resistor 410 and voltage source 402. Similarly, one end of long dispersion trim section electronic input connection 429 is mechanically attached to long dispersion trim section input 229 and the other end of long dispersion trim section electronic input connection 429 is electrically connected to resistor 412 and resistor 410. Similarly, one end of intermediate dispersion trim section electronic output connection 427 is mechanically attached to intermediate dispersion trim section output 227 and the other end of intermediate dispersion trim section electronic output connection 427 is electrically connected to resistor 414 and resistor 412. Similarly, one end of intermediate dispersion trim section electronic input connection 425 is mechanically attached to intermediate dispersion trim section input 225 and the other end of intermediate dispersion trim section electronic input connection 425 is electrically connected to resistor 416 and resistor 414. Similarly, one end of short dispersion trim section electronic output connection 423 is mechanically attached to short dispersion trim section output 223 and the other end of short 423 is electrically connected to resistor 418 and resistor 416. Similarly, one end of short dispersion trim section electronic input connection 421 is mechanically attached to short dispersion trim section input 221 and the other end of short dispersion trim section electronic input connection 421 is electrically connected to resistor 418 and ground reference 404.

The dispersion compensation trimmer section with automatic detection 400 further comprises voltage readout position 441, voltage readout position 443, voltage readout position 445, voltage readout position 447, voltage readout position 449, and voltage readout position 451. Voltage readout position 441 is situated between ground reference 404 and resistor 418. Voltage readout position 443 is situated between resistor 418 and resistor 416. Voltage readout position 445 is situated between resistor 416 and resistor 414. Voltage readout position 447 is situated between resistor 414 and resistor 412. Voltage readout position 449 is situated between resistor 412 and resistor 410. Voltage readout position 451 is situated between resistor 410 and DC power supply 402.

The operation of the dispersion compensation trimmer section with automatic detection may now be described in reference to FIG. 3 and FIG. 4. Upon assembly, short dispersion trim section input 221, is connected to short dispersion trim section output 223, intermediate dispersion trim section input 225, is connected to intermediate dispersion trim section output 227, and long dispersion trim section input 229 is connected to long dispersion trim section output 231. These connections have the advantage of protecting the optical connectors from dirt. Because long dispersion trim section electronic output connection 431, long dispersion trim section electronic input connection 429, intermediate dispersion trim section electronic output connection 427, intermediate dispersion trim section electronic input connection 425, short dispersion trim section electronic output connection 423 and short dispersion trim section electronic input connection 421 are realized by electrical wiring with ends that are embedded in the optical connectors in such a manner as to electrically connect when an optical connection is made, resistor 410, resistor 414 and resistor 418 are electrically shorted, and the voltage at voltage readout position 441, the voltage at voltage readout position 443, the voltage at voltage readout position 445, the voltage at voltage readout position 447, the voltage at voltage readout position 449, and the voltage at voltage readout position 451 reflect this electrical configuration. Upon installation, the correct amount of dispersion trim is chosen and configured using FIG. 4 as reference. The voltage at voltage readout position 441, the voltage at voltage readout position 443, the voltage at voltage readout position 445, the voltage at voltage readout position 447, the voltage at voltage readout position 449, and the voltage at voltage readout position 451 reflect a new electrical configuration after the optical connections have been made. The new electrical configuration can be determined by monitoring the voltage readout positions.

Figure 5:
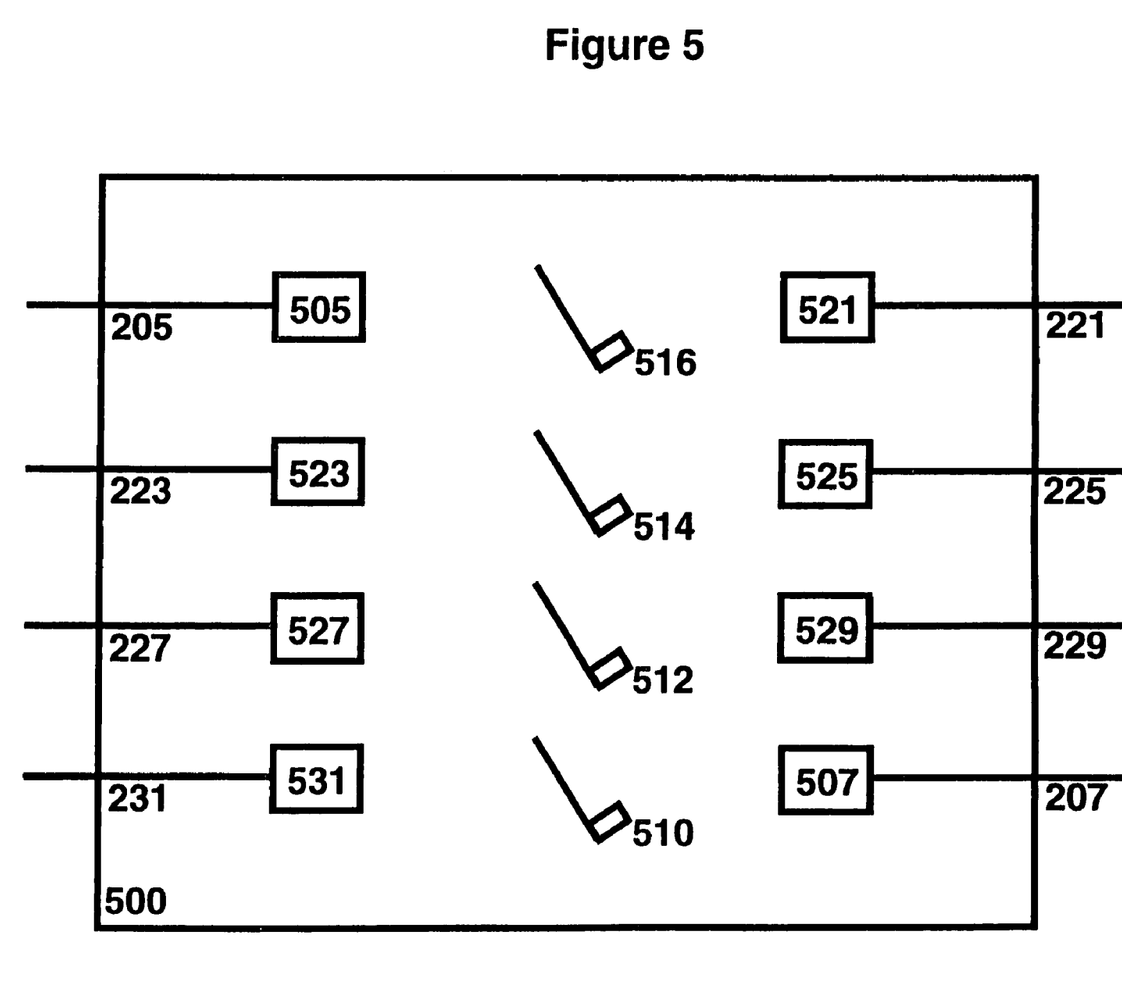
FIG. 5 is a schematic illustration of an automated optomechanical switch configured to achieve a dispersion compensation trimmer section with switchable trim in accordance with one aspect of the invention.

In FIG. 5 is shown in schematic illustration an automated optomechanical switch 500 arranged to achieve a dispersion compensation trimmer section with switchable trim in accordance with one aspect of the invention. Optomechanical switch 500 comprises switchable mirror 516, switchable mirror 514, switchable mirror 512 and switchable mirror 510. In a preferred embodiment switchable mirror 516, switchable mirror 514, switchable mirror 512 and switchable mirror 510 are comprised of a mirrored surface on both the front surface and back surface of a substrate that is mounted on the armature of a miniature motor that switches the mirror into the optical plane and out of the optical plane as specified by FIG. 3. In FIG. 5 switchable mirror 516, switchable mirror 514, switchable mirror 512 and switchable mirror 510 are shown in relation to internal output 205, internal input 207, short dispersion trim section input 221, short dispersion trim section output 223, intermediate dispersion trim section input 225, intermediate dispersion trim section output 227, long dispersion trim section input 229 and long dispersion trim section output 231. Optomechanical switch 500 further comprises optical output coupler 505 connected to internal output 205, optical output coupler 523 connected to short dispersion trim section output 223, optical output coupler 527 connected to intermediate dispersion trim section output 227, and optical output coupler 531 connected to long dispersion trim section output 231. In a preferred embodiment optical output coupler 505, optical output coupler 523, optical output coupler 527 and optical output coupler 531 are realized by a collimating lens such as a graded index (GRIN) lens and act to collimate the exiting optical signals. Optomechanical switch 500 further comprises optical input coupler 521 connected to short dispersion trim section input 221, optical input coupler 525 connected to intermediate dispersion trim section input 225, optical input coupler 527 connected to long dispersion trim section input 229 and optical coupler 507 connected to internal input 207. In a preferred embodiment optical output coupler 505, optical output coupler 523, optical output coupler 527 and optical output coupler 531 are realized by a collimating lens such as a graded index (GRIN) lens and act to efficiently couple the incoming optical signals into optical fiber as is well known in the art.

Switchable mirror 516 is disposed between internal output 205 and short dispersion trim section input 221. When switchable mirror 516 is set out of the optical plane the optical signal exiting internal output 205 is coupled into short dispersion trim section input 221. When switchable mirror 516 is set in the optical plane the optical signal exiting internal output 205 is incident on mirror 516 and is directed away from short dispersion trim section input 221 and towards the in optical plane positions of switchable mirror 514, switchable mirror 512 and switchable mirror 510.

Switchable mirror 514 is disposed between short dispersion trim output 223 and intermediate dispersion trim input 225. When switchable mirror 514 is set out of the optical plane any optical signal exiting short dispersion trim section output 223 is coupled into intermediate dispersion trim section input 225 and any optical signal propagating from the in optical plane position of switchable mirror 516 will propagate towards switchable mirror 512 and switchable mirror 510. When switchable mirror 514 is set in the optical plane any optical signal propagating from in optical plane position of mirror 516 will be directed into intermediate dispersion trim section input 225 and any optical signal exiting short dispersion trim section output 223 will be directed toward the in optical plane positions of switchable mirror 512 and switchable mirror 510.

Switchable mirror 512 is disposed between intermediate dispersion trim output 227 and long dispersion trim input 229. When switchable mirror 512 is set out of the optical plane any optical signal exiting intermediate dispersion trim section output 227 is coupled into long dispersion trim section input 229 and any optical signal propagating from the in optical plane position of switchable mirror 516 or switchable mirror 514 will propagate towards switchable mirror 510. When switchable mirror 512 is set in the optical plane, any optical signal propagating from "in" optical plane position of mirror 516 or 514 will be directed into long dispersion trim section input 229 and any optical signal exiting intermediate dispersion trim section output 227 will be directed toward the in optical plane positions of switchable mirror 510.

Switchable mirror 510 is disposed between long dispersion trim output 231 and internal input 207. When switchable mirror 510 is set out of the optical plane the optical signal exiting long dispersion trim section output 231 is coupled into internal input 207. When switchable mirror 510 is set in the optical plane the optical signal propagating from any of switchable mirror 516, switchable mirror 514 or switchable mirror 512 will be coupled into internal input 207.

Therefore, by setting the positions of switchable mirror 516, switchable mirror 514, switchable mirror 512 and switchable mirror 510 any dispersion trim value of FIG. 3 may be automatically realized. In a preferred embodiment, the position of switchable mirror 516, switchable mirror 514, switchable mirror 512 and switchable mirror 510 will be electrically readable, and will therefore telegraph the state of automated optomechanical switch 500 arranged to achieve a dispersion compensation trimmer section with switchable trim.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A variable dispersion compensation system having a plurality of selectable configurations, the variable dispersion compensation system comprising:
   a standard dispersion compensator having an internal input and an internal output;
   a first trimmer having a first input and a first output;
   a second trimmer having a second input and a second output;
   a third trimmer having a third input and a third output, wherein the internal output is in a first optical path with the first input, the first output is in a second optical path with the second input, the second output is in a third optical path with the third input, and the third output is in a fourth optical path with the internal input;
   a first optomechanical switch in the first optical path, the first optomechanical switch having a first in position and a first out position;
   a second optomechanical switch in the second optical path, the second optomechanical switch having a second in position and a second out position;
   a third optomechanical switch in the third optical path, the third optomechanical switch having a third in position and a third out position; and
   a fourth optomechanical switch in the fourth optical path, the fourth optomechanical switch having a fourth in position and a fourth out position,
   wherein the first optomechanical switch in the first out position enables optical communication between the internal output and the first input,
   wherein the first optomechanical in the first in position enables optical communication between the internal output and at least one of the second, third or fourth optomechanical switches,
   wherein the second optomechanical switch in the second out position enables optical communication between the first output and the second input and further enables optical communication between the first optomechanical switch and at least one of the third or fourth optomechanical switches,
   wherein the second optomechanical switch in the second in position enables optical communication from the first optomechanical switch to reach the second input and further enables optical communication between the first output and at least one of the third or fourth optomechanical switches,
   wherein the third optomechanical switch in the third out position enables optical communication between the second output and the third input and further enables optical communication from at least one of the first or second optomechanical switches to reach the fourth optomechanical switch,
   wherein the third optomechanical switch in the third in position enables optical communication from at least one of the first or second optomechanical switches to reach the third input and further enables optical communication between the second output and the fourth optomechanical switch,
   wherein the fourth optomechanical switch in the fourth out position enables optical communication between the third output and the internal input, and
   wherein the fourth optomechanical switch is in the fourth in position enables optical communication from at least one of the first, second or third optomechanical switches to reach the internal input.

2. The variable dispersion compensation system of claim 1, wherein the standard dispersion compensator is configured to correct approximately 70 to 100 percent of dispersion in a fiber span.

3. The variable dispersion compensation system of claim 1, wherein the standard dispersion compensator is configured to correct approximately 100 to 130 percent of dispersion in a fiber span.

4. The variable dispersion compensation system of claim 1, wherein at least one of the first, second, or third trimmers include a positive dispersion compensation trim section.

5. The variable dispersion compensation system of claim 1, wherein at least one of the first, second, or third trimmers include a negative dispersion compensation trim section.

6. The variable dispersion compensation system of claim 1, wherein the first, second, third, and fourth in positions and the first, second, third, and fourth out positions are electrically readable.

7. The variable dispersion compensation system of claim 1, wherein the first, second, third and fourth optomechanical switches are configured to be remotely activated.

8. The variable dispersion compensation system of claim 1, wherein a length of each of the first, second and third trimmers is dictated by the series:

$$\delta, 2\delta, 3\delta \ldots 2^n \delta$$

where $\delta$=length of the first trimmer; and n=total number trimmers.

9. The variable dispersion compensation system of claim 1, wherein the first, second and third trimmers each include a length of dispersion compensating fiber.

10. The variable dispersion compensation system of claim 1, wherein the first, second and third trimmers each define different dispersion compensation values.

11. The variable dispersion compensation system of claim 1 further comprising a detection component connected to the first, second and third trimmers, wherein the detection component is configured to electrically detect a present configuration among the plurality of selectable configurations.

12. The variable dispersion compensation system of claim 11, wherein the detection component comprises a voltage dividing resistance ladder.

13. The variable dispersion compensation system of claim 12, wherein the voltage dividing resistance ladder comprises a plurality of resistors, each connected to at least one of the first, second, or third trimmers.

14. The variable dispersion compensation system of claim 11, wherein the detection component comprises a ground reference and a DC power supply.

15. The variable dispersion compensation system of claim 11, wherein the detection component comprises a plurality of voltage readouts.

16. The variable dispersion compensation system of claim 5, wherein each of the plurality of voltage readouts displays a voltage indicative of the present configuration.

17. The variable dispersion compensation system of claim 1, wherein the first, second, third and fourth optomechanical switches each include a switchable mirror.

18. The variable dispersion compensation system of claim 17, wherein the switchable minor includes a substrate having a front mirrored surface and a back mirrored surface, and wherein the substrate is mounted on an armature of a motor.

19. The variable dispersion compensation system of claim 1 further comprising a plurality of optical couplers, each connected to at least one of the internal input, the internal output, the first input, the second input, the third input, the first output, the second output, or the third output.

20. The variable dispersion compensation system of claim 19, wherein each of the plurality of optical couplers include a collimating lens.

* * * * *

UNITED STATES PATENT AND TRADEMARK OFFICE
CERTIFICATE OF CORRECTION

PATENT NO. : 7,471,858 B2  Page 1 of 1
APPLICATION NO. : 11/515480
DATED : December 30, 2008
INVENTOR(S) : Guo et al.

It is certified that error appears in the above-identified patent and that said Letters Patent is hereby corrected as shown below:

COL. 12, line 12 (CLAIM 16), delete "5" and insert therefor --15-- so that the phrase reads "The variable dispersion compensation system of claim 15 . . ."

COL. 12, line 18 (CLAIM 18), after "switchable" delete "minor" and insert therefore --mirror--

Signed and Sealed this

Twenty-fourth Day of March, 2009

JOHN DOLL
*Acting Director of the United States Patent and Trademark Office*